United States Patent
Chiba

[11] Patent Number: 6,160,677
[45] Date of Patent: Dec. 12, 2000

[54] INFORMATION PROCESSING DEVICE HAVING BLOCK-SHAPED RACK GEARS COUPLED IN TRAVEL RAIL

[75] Inventor: Takeyoshi Chiba, Yonezawa, Japan

[73] Assignee: NEC Corporation, Tokyo, Japan

[21] Appl. No.: 09/197,906

[22] Filed: Nov. 23, 1998

[30] Foreign Application Priority Data

Nov. 28, 1997 [JP] Japan ..................................... 9-327526

[51] Int. Cl.[7] .................................................. G11B 15/68
[52] U.S. Cl. .......................................................... 360/92
[58] Field of Search ........................... 360/91, 92, 98.04, 360/98.06; 369/33, 34, 36, 38, 178, 179, 191, 192; 414/331, 332

[56] References Cited

U.S. PATENT DOCUMENTS

| | | | |
|---|---|---|---|
| 4,275,425 | 6/1981 | Watanabe et al. | 360/92 |
| 5,442,500 | 8/1995 | Hidano et al. | 369/34 |
| 5,646,917 | 7/1997 | Miyoshi et al. | 369/34 |
| 5,940,354 | 8/1999 | Inoue | 369/35 |

*Primary Examiner*—David L. Ometz
*Attorney, Agent, or Firm*—Laff, Whitesel & Saret, Ltd.; J. Warren Whitesel

[57] ABSTRACT

An information processing device functioning as an automated library-data processing device for performing recording/reproducing operations on cartridge magnetic tapes is provided, by which an increase of the device size when providing for an increase of the processed data can be prevented and such increase of the processed data can be simply performed, and the increase in the manufacturing cost of each member can be avoided. The device comprises a body in which a storage shelf for storing plural storage media is provided; a drive mechanism for recording and reproducing; an access mechanism which travels and accesses the drive mechanism under the guidance of a guide rail, wherein the access mechanism has a hand for inserting and extracting each storage medium to and from the storage shelf and for inputting and outputting each storage medium to and from the drive mechanism; a travel rail disposed along the guide rail; and a plurality of rack gears, having a block shape, inserted into the travel rail and coupled with each other, and wherein a pinion gear in the access mechanism is engaged with each rack gear.

8 Claims, 2 Drawing Sheets

INFORMATION PROCESSING DEVICE HAVING BLOCK-SHAPED RACK GEARS COUPLED IN TRAVEL RAIL

BACKGROUND OF THE INVENTION

1. Field of the Invention

The present invention relates to an information processing device for processing storage media such as a recording/reproducing cartridge magnetic tape automatically and, in particular, relates to a coupling mechanism for providing an increase in the amount of data to be processed.

2. Description of the Related Art

FIG. 2 is a perspective view showing a conventional example of information processing devices for automatically processing a cartridge magnetic tape as a storage medium. In this example, body 7 is a casing main body of the device, containing drive mechanism 2, storage shelf 3, entry/exit section 4, and the like. The device also includes access mechanism 6 including a hand 5 which can freely transfer storage medium 1 in any of the vertical, cross, and longitudinal directions.

The movement of access mechanism 6 is guided along guide rail 8 built in the lower part of body 7. Guide rail 11 is also built in the ceiling of body 7, parallel to the guide rail 8. The lower guide rail 8 has a rack gear (not shown), while the access mechanism 6 has a pinion gear and a motor for driving the pinion gear (both not shown). By engaging the pinion gear with the rack gear of guide rail 8, the movement of the whole of access mechanism 6 is guided by the guide rail 11 at the ceiling side.

The conventional structure as shown in FIG. 2 has structural disadvantages in consideration of specification changes for providing an increase in the amount of data to be processed. That is, in order to increase the amount of processed data in the above structure, plural bodies 7 (as shown in FIG. 2) are coupled with each other, thereby increasing the size of drive mechanism 2 and storage shelf 3. In this coupling, guide rails 8 and guide rails 11 in both bodies 7 are respectively coupled with each other so as to continuously drive access mechanism 6 from one body 7 to the other body 7.

In the above case, (i) guide rail 8 should have the rigidity necessary for access mechanism 6 to travel normally, and (ii) at the joint of the rack gears, modules having accurate teeth and pitch are necessary. In order to satisfy these two points, material for making the rails should have high processing accuracy, and the assembling process should be efficiently performed. Consequently, there is an unanticipated increase in both the size of the whole device including the bodies 7 and the cost.

SUMMARY OF THE INVENTION

In consideration of the above circumstances, the present invention relates to an information processing device functioning as an automated library-data processing device for performing recording and reproducing operations on multiple cartridge magnetic tapes, and an objective of the present invention is to provide an information processing device which can avoid increasing the device size when providing for an increase in the amount of processed data, and in which such an increase in the amount of processed data can be simply performed, thereby avoiding an increase of the manufacturing cost of each part.

Therefore, the present invention provides an information processing device suitable for an automated library-data processing device which stores storage media (in particular, a great number of cartridge magnetic tapes) and performs recording and reproducing operations on the storage media, the information processing device comprising a body in which a storage shelf for storing plural storage media is provided; a drive mechanism for performing recording and reproducing operations of each storage medium; and an access mechanism which travels and accesses the drive mechanism under the guidance of a guide rail, wherein the access mechanism has a hand for inserting and extracting each storage medium to and from the storage shelf and for inputting and outputting each storage medium to and from the drive mechanism, and the information processing device further comprises:

a travel rail whose length is substantially the same as the length of the guide rail, and which is disposed along the guide rail; and a plurality of rack gears having a block shape which are inserted into the travel rail and coupled with each other in the longitudinal direction of the travel rail, and wherein a pinion drive gear is provided in a motor section for the traveling of the access mechanism, and the pinion drive gear is engaged with each rack gear.

Here, two sets of the above-described devices, each functioning as the automated library-data processing device, can be coupled with each other in a manner such that the bodies, the guide rails, and the travel rails of both devices are respectively coupled with each other, and the rack gears are inserted from one end of the coupled travel rails in turn, the number of the rack gears corresponding to the length of the coupled travel rails, so as to increase the number of storage media stored in the storage shelf.

It is desirable that the teeth and the pitch thereof be accurately and regularly formed at a joint area of the rack gears so that the coupled rack gears function as a single gear.

The cross-section of the travel rail may have a C-channel shape so as to maintain the rigidity of the block-shaped rack gears which are coupled with each other, and the rack gears are inserted in turn from one end of the travel rail toward the other end.

Typically, the guide rail and the travel rail are disposed along the X axis of the two-dimensional X-Y coordinate axes, and the hand in the access mechanism is movable in the vertical direction along the Y axis while grasping any storage medium.

Also typically, the guide rail is a set of parallel rails disposed along the X axis of the two-dimensional X-Y coordinate axes and the access mechanism is movable under the guidance of said guide rail.

According to the information processing device, when, for example, increase of processed data is aimed at, the rails for guiding the traveling of the access mechanism in the body can be easily and precisely coupled. Therefore, the assembling process can be efficiently performed and the necessary processing accuracy of each member can be moderated in comparison with the conventional devices.

DESCRIPTION OF THE PREFERRED EMBODIMENTS

Hereinbelow, the coupling mechanism for increasing the library data of an information processing device as an embodiment according to the present invention will be explained with reference to the drawings.

Figure 1:
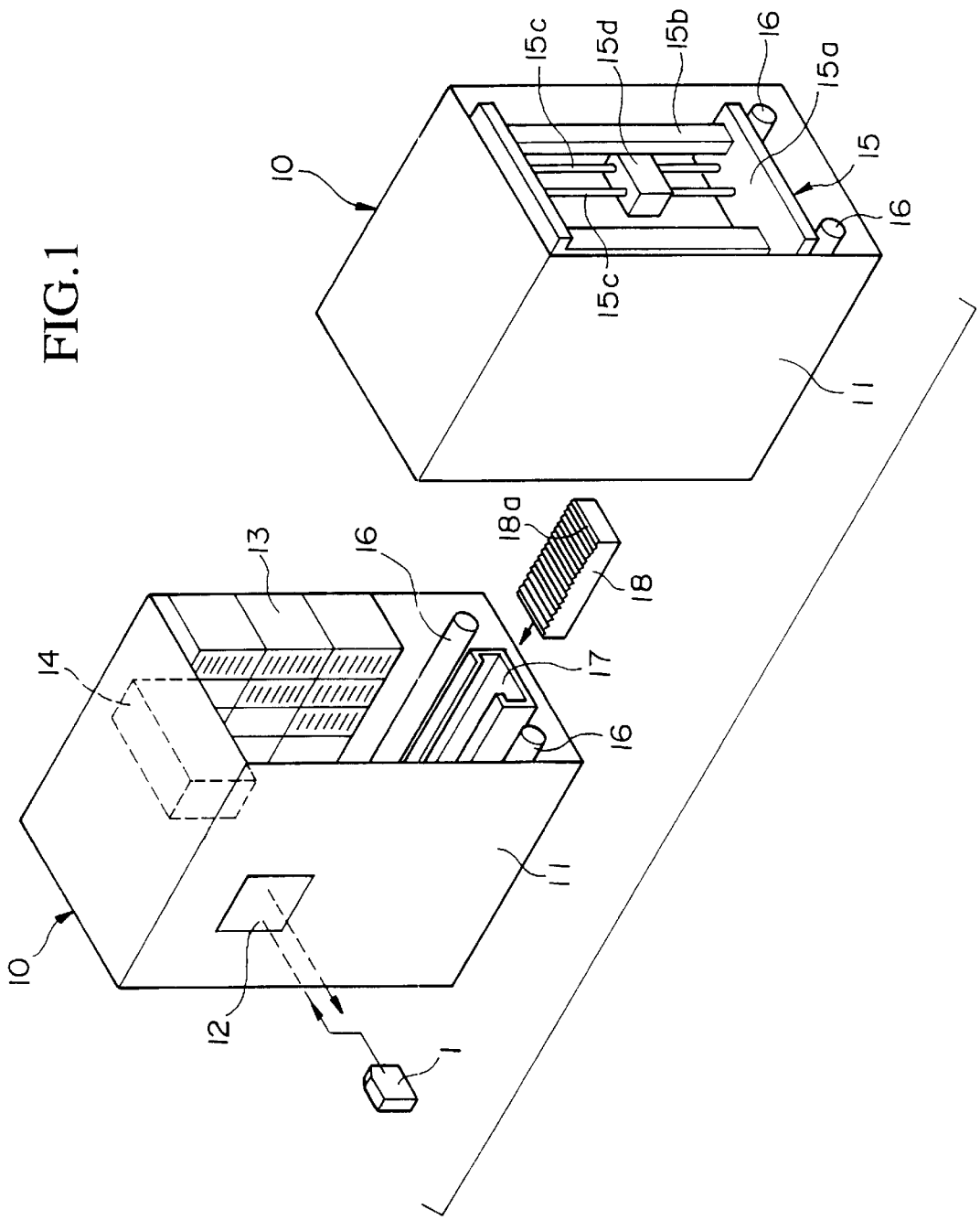
FIG. 1 is a perspective view showing a coupling mechanism for automated library-data processing devices as an embodiment of the information processing device according to the present invention.
Figure 2:
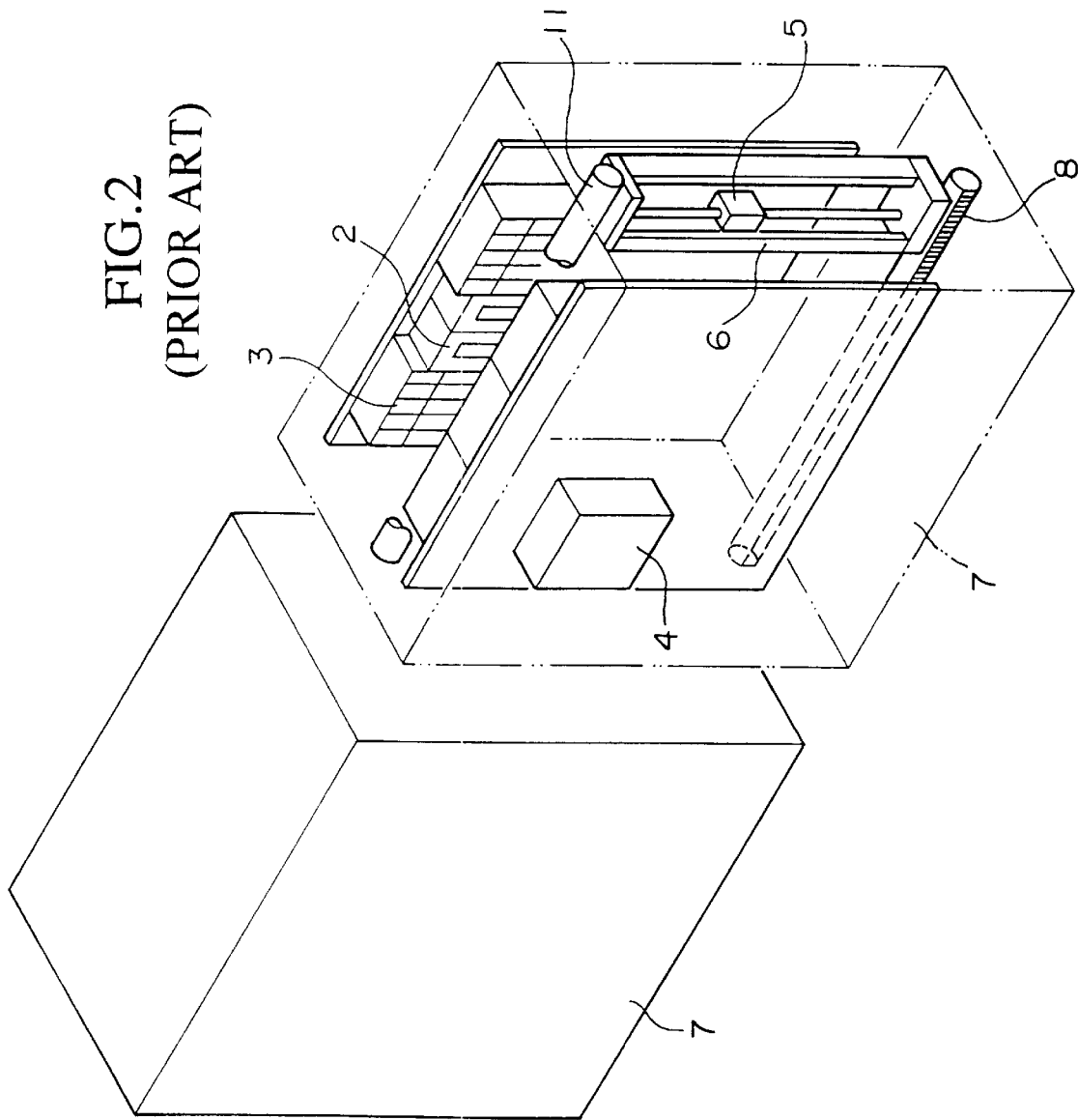
FIG. 2 is a perspective view showing a conventional example of a coupling mechanism for automated library-data processing devices.

FIG. 1 is a perspective view showing an embodiment relating to the information processing device for automatically processing the recording and reproduction of plural cartridge magnetic tapes as storage media (1).

The device comprises body 10 as a casing main body, and this body 10 contains storage shelf 13 for storing plural storage media 1 and drive mechanism 14 for performing data loading/storing operations with respect to each storage medium 1. In side wall 11 of the body, storage medium entry section 12 as an opening is provided for inputting storage medium 1 from the outside of the device into storage shelf 13, and outputting the storage medium from the shelf 13 to the outside.

The device also comprises access mechanism 15 for selectively accessing a target storage medium 1 stored in storage shelf 13. The access mechanism 15 comprises base 15a which moves under the guidance of a pair of guide rails 16 disposed at both sides of the base 15a in the longitudinal direction of body 10. On this base 15a, support 15b, elevating rails 15c, and hand 15d, which moves in the vertical direction under the guidance of elevating rails 15c, are provided. In the access mechanism 15 integrally consisting of the above elements, a drive motor (not shown) for making this mechanism travel is mounted and the mechanism 15 can travel in the X direction of what is termed the (two-dimensional) X-Y coordinate axes under the guidance of guide rails 16. The hand 15d can vertically move in the Y direction of the above X-Y coordinate axes under the guidance of elevating rails 15c and can grasp and handle storage medium 1 stored in the storage shelf 13.

The general travel of the above access mechanism 15 can be performed along travel rail 17 whose cross-section has a C-channel shape. The travel rail 17 is disposed between the pair of guide rails 16, and is integrally coupled with the mechanism.

Over almost the full length of this rail, plural rack gears 18 with block shapes having suitable sizes for the height, width and length are inserted into the groove of the travel rail 17 and are coupled with each other. A stopper (not shown) to which the rack gear 18 at the head is pushed and positioned is provided at the end of travel rail 17. In addition, at an adjacent area of the joint of two rack gears 18, the pitch of teeth 18a of the gears is regularly and accurately formed.

Therefore, the base 15a of the access mechanism 15 comprises a pinion (drive) gear (not shown) which is engaged with the rack gear 18 inserted in the travel rail 17, and travel of the access mechanism is performed by engaging the pinion gear, which is rotationally driven by a drive motor, with each rack gear 18.

According to the above structure, when the amount of data to be processed is increased, another device having the same specifications as those of the above-explained present embodiment is prepared, and both bodies 10 are coupled with each other. In the coupling operation, guide rails 16 of the two bodies are coupled with each other, and travel rails 17 are similarly coupled with each other. In addition, the rack gear 18 at the rear end in one body 10 and the rack gear 18 at the front end in the other body are accurately coupled with each other so as to maintain accurate pitch of teeth 18a over the coupled gears.

Regarding coupling of guide rails 16 or travel rails 17, convex and concave portions may be provided at each side of the joint, and these convex and concave portions engaged with each other. In this case, it is possible to precisely position the joint of the coupled ends of the relevant rails in both devices.

By coupling the same devices with each other as described above, an increase in the system size to accommodate an increase in the amount of processed data can be realized. Here, a single access mechanism 15 is possible for two or more coupled devices because the single access mechanism can travel over two devices under the guidance of coupled guide rails 16 and travel rails 17.

In addition, the adjustment at the time of coupling the same two devices can be easily performed with respect to the two directions, that is, the vertical and cross directions.

As the rack gear 18, a single processed member may be used. However, blocks having a moderate length as in the present embodiment can be formed by molding. Furthermore, travel rail 17 has a C-shape cross-section so as to maintain the rigidity of rack gear 18 and simplify inserting and assembling processes. Therefore, the travel rail 17 can be formed by aluminum extrusion or drawing molding or the like; thus, the productivity can be raised and the cost can be reduced.

What is claimed is:

1. An information processing device functioning as an automated library-data processing device, which comprises a guide rail, a body having a storage shelf for storing a plurality of storage media; a drive mechanism for performing recording and reproducing operations on each storage medium; and an access mechanism having a motor section, said access mechanism traveling and accessing the drive mechanism under a guidance of said guide rail, wherein the access mechanism has a hand means for inserting and extracting each storage medium to and from the storage shelf and for inputting and outputting each storage medium to and from the drive mechanism, and the information processing device further comprises:

a travel rail whose length is substantially the same as the length of the guide rail, and which is disposed along the guide rail; and a plurality of rack gears having a block shape which are inserted into the travel rail and coupled with each other in the longitudinal direction of the travel rail, and a pinion drive gear in said motor section for moving the traveling access mechanism, and the pinion drive gear being engaged with each rack gear, and wherein two sets of said devices, each functioning as an automated library-data processing device, can be coupled with each other in a manner such that the bodies, the guide rails, and the travel rails of both sets of said devices are respectively coupled with each other, and the rack gears are inserted from one end of the coupled travel rails, the number of the rack gears corresponds to the overall length of the coupled travel rails, so as to increase the number of storage media stored in the storage shelves.

2. An information processing device as claimed in claim 1, wherein teeth and a pitch of said rack gears are accurately and regularly formed at a joint area of the rack gears so that the coupled rack gears function as a single gear.

3. An information processing device as claimed in claim 2, wherein the cross-section of the travel rail has a C-channel shape so as to maintain the rigidity of the block-shaped rack gears which are coupled with each other, and the rack gears are inserted in turn from one end of the travel rail toward the other end.

4. An information processing device as claimed in claim 3, wherein the guide rail and the travel rail are disposed along the X axis of the two-dimensional X-Y coordinate axes, and the hand means in the access mechanism is movable in the vertical direction along the Y axis while grasping any of the plurality of storage media.

5. An information processing device as claimed in claim 4, wherein the guide rail is a set of parallel rails disposed along the X axis of the two-dimensional X-Y coordinate axes and the access mechanism is movable under the guidance of said parallel rails.

6. An information processing device as claimed in claim 1, wherein the cross-section of the travel rail has a C-channel shape so as to maintain the rigidity of the block-shaped rack gears which are coupled with each other, and the rack gears are inserted in turn from one end of the travel rail toward the other end.

7. An information processing device as claimed in claim 1, wherein the guide rail and the travel rail are disposed along the X axis of the two-dimensional X-Y coordinate axes, and the hand means in the access mechanism is movable in the vertical direction along the Y axis while grasping any of the plurality of storage media.

8. An information processing device as claimed in claim 1, wherein the guide rail is a set of parallel rails disposed along the X axis of the two-dimensional X-Y coordinate axes and the access mechanism is movable under the guidance of said parallel rails.

* * * * *